United States Patent Office 2,846,461
Patented Aug. 5, 1958

2,846,461

PRODUCTION OF ESTERS OF DITHIOCARBOXYLIC ACIDS

Ralph B. Thompson, Hinsdale, and Joseph A. Chenicek, Bensenville, Ill., assignors to Universal Oil Products Company, Des Plaines, Ill., a corporation of Delaware No Drawing. Application February 21, 1955
Serial No. 489,742

3 Claims. (Cl. 260—455)

This invention relates to new sulfur-containing compounds and to a method for their production. More particularly, this invention relates to esters of dithiocarboxylic acids and, still more particularly, to $\gamma$-keto esters of dithiocarboxylic acids.

An object of this invention is to provide a process for the production of $\gamma$-ketoalkyl esters of dithiocarboxylic acid.

A further object of this invention is to provide a process for the production of a $\gamma$-ketopropyl ester of dithiopropionic acid.

One embodiment of this invention resides in a process for producing an ester of a dithiocarboxylic acid by reacting a dithiocarboxylic acid with an $\alpha,\beta$-unsaturated carbonyl compound, and recovering the resultant ester of the dithioboxylic acid.

Another embodiment of this invention is found in a process for producing a $\gamma$-ketoalkyl ester of a dithiocarboxylic acid by reacting a dithiocarboxylic acid with an $\alpha,\beta$-unsaturated ketone at a temperature in the range of from about 20° to about 80° C., and recovering the resultant $\gamma$-ketoalkyl ester of the dithiocarboxylic acid.

Yet another embodiment of this invention resides in a process for producing a $\gamma$-ketoalkyl ester of a dithiocarboxylic acid by reacting a dithiocarboxylic acid with an $\alpha,\beta$-unsaturated aldehyde at a temperature in the range of from about 20° to about 80° C., and recovering the resultant $\gamma$-ketoalkyl ester of the dithiocarboxylic acid.

Still another embodiment of this invention is found in a new composition of matter comprising a $\gamma$-ketoalkyl ester of a dithiocarboxylic acid.

A specific embodiment of this invention is found in a process for preparing a $\gamma$-ketobutyl ester of a dithiocarboxylic acid by reacting dithiopropionic acid with methly vinyl ketone at a temperature in the range of from about 20° to about 80° C., and recovering the resultant $\gamma$-ketobutyldithiopropionate.

Another specific embodiment of this invention resides in a new composition of matter comprising $\alpha$-phenyl-$\gamma$-ketobutyldithiopropionate.

Other objects and embodiments of the invention relating to alternative dithiocarboxylic acids and to alternative $\alpha,\beta$-unsaturated carbonyl compounds will be found in the following further detailed description of this invention.

The $\alpha,\beta$-unsaturated compounds which are reacted with a dithiocarboxylic acid according to the process of this invention are characterized by the presence of an "active" olefinic or double bond. This olefinic or double bond has its activity enhanced for the present process by the presence on a carbon atom adjacent to the double bond of certain activating groups among which are included a keto group, a cyano group, a sulfone group, a sulfoxide group, a nitro group, or a pyridine nucleus. While the exact manner in which these activating groups increase the activity of the double bond thereby producing "active" olefins is not known, they effectively render these particular olefins "active" at low temperature for reaction with a dithiocarboxylic acid. The "active" olefins which are used as starting materials in this process may be obtained from any suitable source. Generic formulae of suitable utilizable active olefins are given in the following table:

Table I

| | |
|---|---|
| $\alpha,\beta$-unsaturated aldehydes | $R-\overset{R}{\underset{\|}{C}}=\overset{R}{\underset{\|}{C}}-\overset{O}{\overset{\|}{C}}-H$ |
| $\alpha,\beta$-unsaturated ketones | $R-\overset{R}{\underset{\|}{C}}=\overset{R}{\underset{\|}{C}}-\overset{O}{\overset{\|}{C}}-R'$ |
| di-$\alpha,\beta$-unsaturated ketones | $R-\overset{R}{\underset{\|}{C}}=\overset{R}{\underset{\|}{C}}-\overset{O}{\overset{\|}{C}}-\overset{R}{\underset{\|}{C}}=\overset{R}{\underset{\|}{C}}-R$ |
| $\alpha,\beta$-unsaturated acids | $R-\overset{R}{\underset{\|}{C}}=\overset{R}{\underset{\|}{C}}-\overset{O}{\overset{\|}{C}}-OH$ |
| $\alpha,\beta$-unsaturated esters | $R-\overset{R}{\underset{\|}{C}}=\overset{R}{\underset{\|}{C}}-\overset{O}{\overset{\|}{C}}-O-R'$ |
| $\alpha,\beta$-unsaturated nitriles | $R-\overset{R}{\underset{\|}{C}}=\overset{R}{\underset{\|}{C}}-C\equiv N$ |
| $\alpha,\beta$-unsaturated sulfones | $R-\overset{R}{\underset{\|}{C}}=\overset{R}{\underset{\|}{C}}-\overset{O}{\underset{\overset{\|}{O}}{\overset{\|}{S}}}-R'$ |
| $\alpha,\beta$-unsaturated sulfoxides | $R-\overset{R}{\underset{\|}{C}}=\overset{R}{\underset{\|}{C}}-\overset{O}{\overset{\|}{S}}-R'$ |
| $\alpha,\beta$-unsaturated nitro compounds | $R-\overset{R}{\underset{\|}{C}}=\overset{R}{\underset{\|}{C}}-NO_2$ |
| $\alpha$-vinyl pyridines | $R-\overset{R}{\underset{\|}{C}}=\overset{R}{\underset{\|}{C}}-\underset{}{\bigcirc}_N$ |
| $\gamma$-vinyl pyridines | $R-\overset{R}{\underset{\|}{C}}=\overset{R}{\underset{\|}{C}}-\underset{}{\bigcirc}_N$ |

In the preceding table, R represents a member of the group consisting of hydrogen, an alkyl group, an aryl group, an alkaryl group, an aralkyl group, and a heterocyclic group, and R' represents a member of the group consisting of an alkyl group, an aryl group, an alkaryl group, an aralkyl group, and a heterocyclic group. Simple members of the above group of compounds are formed when R is hydrogen and R' is a methyl group. Such compounds are illustrated in the following table.

Table II

| Structure | Name |
|---|---|
| H—C(H)=C(H)—C(O)—H | acrolein. |
| H—C(H)=C(H)—C(O)—CH₃ | methyl vinyl ketone. |
| H—C(H)=C(H)—C(O)—C(H)=C(H)—H | 1,4-pentadiene-3-one. |
| H—C(H)=C(H)—C(O)—OH | acrylic acid. |
| H—C(H)=C(H)—C(O)—O—CH₃ | methyl acrylate. |
| H—C(H)=C(H)—C≡N | acrylonitrile. |
| H—C(H)=C(H)—S(O)(O)—CH₃ | methyl vinly sulfone. |
| H—C(H)=C(H)—S(O)—CH₃ | methyl vinyl sulfoxide. |
| H—C(H)=C(H)—NO₂ | nitroethylene. |
| H—C(H)=C(H)—(pyridyl, N ortho) | α-vinyl pyridine. |
| H—C(H)=C(H)—(pyridyl, N para) | λ-vinyl pyridine. |

Other utilizable α,β-unsaturated aldehydes in addition to acrolein include crotonaldehyde, tiglic aldehyde, citral, 2,6-nonadiene-1-al, α-ethyl-β-propyl acrolein, etc. α,β-unsaturated ketones which are used as starting materials in this process include methyl vinyl ketone, ethyl vinyl ketone, propyl vinyl ketone, butyl vinyl ketone, etc., phenyl vinyl ketone, tolyl vinyl ketone, etc., mesityl oxide, benzalacetone, benzalacetophenone, dypnone, pseudo ionone, etc. Di-α,β-unsaturated ketones in addition to 1,4-pentadiene-3-one which are used as starting materials in this process include 4-oxo-2,5-heptadiene, 5-oxo-3,6-nonadiene, 6-oxo-4,7-undecadiene, 7-oxo-5,8-tridecadiene, dibenzalacetone, phorone, di-cinnamylidine acetone, difurfuralacetone, 2,6-dicyclohexylidine cyclohexanone, dicyclohexvylidineacetone, etc. α,β-unsaturated acids in addition to acrylic acid which are used as starting materials in this process include crotonic acid, isocrotonic acid, angelic acid, tiglic acid, geranic acid, dihydrogeranic acid, etc. α,β-unsaturated esters in addition to methyl acrylate include ethyl acrylate, etc., methyl crotonate, ethyl crotonate, propyl crotonate, etc. Other unsaturated compounds with an active double bond which are used as starting materials in this process include 1-cyano-propylene, 2-cyano-propylene, ethyl vinyl sulfone, propyl vinyl sulfone, ethyl vinyl sulfoxide, propyl vinyl sulfoxide, 1-nitro-propylene, 2-nitro-propylene, ω-nitro-styrene, etc. Other α,β-unsaturated compounds containing an active double bond are well known in the art and within the broad scope of this invention.

Dithiocarboxylic acids and various derivatives thereof which are suitable as starting materials in this process may be prepared by reacting carbon disulfide with an alkyl magnesium halide in a Grignard reaction in an ether medium at a temperature in the range of from about 20° to about 50° C. The dithiocarboxylic acids which are reacted with an α,β-unsaturated carbonyl compound according to the process of this invention include dithioacetic acid, dithiopropionic acid, dithio-n-butyric acid, dithio-isobutyric acid, dithiopentanoic acid, dithiocaproic acid, dithioisocaproic acid, 3,3-dimethyl dithiobutyric acid, 3,3-diethyl dithiobutyric acid, 2-methyl dithiopentanoic acid, 3-methyl dithiopentanoic acid, 4-methyl dithiopentanoic acid, 2,3-dimethyl dithiopentanoic acid, 3,3-dimethyl dithiopentanoic acid, dithiobenzoic acid, etc. It is to be understood that the above mentioned dithiocarboxylic acids are only representatives of the class of acids which may be used in the process of this invention and that said invention is not necessarily limited thereto.

These dithiocarboxylic acids may then be reacted with an α,β-unsaturated carbonyl compound such as α,β-unsaturated aldehyde or an α,β-unsaturated ketone, a specific example of this process being illustrated by the following equation which indicates the reaction between dithiopropionic acid and methylvinyl ketone to form γ-ketoalkyldithiocarboxylate.

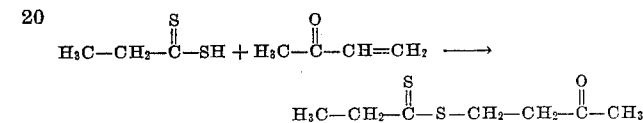

To produce such a γ-ketoalkyldithiocarboxylate the process is carried out at a temperature in the range of from about 0° C. to about 150° C. or more, the preferred range being from about 20° to about 80° C. The resultant reaction mixture is treated by adding said product to water (or vice versa), and stirring the aqueous mixture with an organic solvent such as a diethyl ether in which the γ-ketoalkyldithiocarboxylate is soluble. The ether solution or other solvent solution is then fractionally distilled in order to separate the solvent from the desired γ-ketoalkyldithiocarboxylate, which is generally liquid at room temperature and atmospheric pressure.

The process of this invention may be effected in any suitable manner and may comprise either a batch or continuous type operation. When a batch type operation is used, a quantity of the dithiocarboxylic acid and the α,β-unsaturated carbonyl compound is placed in a proper reaction vessel such as a condensation flask provided with heating and stirring means. The mixture is then heated to the desired temperature and maintained thereat for a predetermined period of time after which the flask and the contents thereof is cooled to room temperature and the desired γ-ketoalkyldithiocarboxylate is separated and purified by conventional means, such as fractional distillation.

The process of this invention may also be effected by a continuous type operation. When this type of operation is used, a quantity of the starting material, namely the dithiocarboxylic acid and the α,β-unsaturated carbonyl compound are continuously charged to a reactor maintained at suitable operating conditions of temperature and pressure, or, if so desired, may be admixed before being charged to said reactor. The reaction vessel may comprise an unpacked vessel or coil or may be lined with an adsorbent packing material such as dehydrated bauxite, alumina, fire brick, and the like. After a predetermined residence time, the reaction product is continuously withdrawn and separated from any unreacted starting material, the latter being recycled to form a portion of the feed stock.

Esters of dithiocarboxylic acids which may be prepared according to the process of this invention, which may comprise new compositions of matter, include γ-ketobutyldithiopropionate, γ-ketopentyldithiopropionate, γ-ketohexyldithiopropionate, etc., α-methyl-γ-ketopropyldithiopropionate, β-methyl-γ-ketopropyldithiopropionate, α-ethyl-γ-ketopropyldithiopropionate, β-ethyl-γ-ketopropyldithiopropionate, α-methyl-γ-ketobutyldithiopropionate, etc., α-phenyl-γ-ketobutyldithiopropionate, β-phenyl-γ-ketobutyldithiopropionate, etc.

The γ-ketoalkyldithiocarboxylates and related compounds which are formed as hereinbefore set forth are useful as intermediates in the production of medicinals, pesticides, insecticides, etc. In addition, the compounds may also be utilized as antioxidants to delay the development of rancidity in lard or other organic substances such as lubricating oil, gasoline, etc., which are susceptible to oxidative deterioration.

The following examples are given to illustrate the process of the present invention which, however, are not intended to limit the generally broad scope of the present invention in strict accordance therewith.

*Example I*

1 mol of carbon disulfide was added to 1 mol of ethyl magnesium bromide in an ether solution at a temperature of approximately 35° C. The mixture was thoroughly stirred and after a period of approximately 1 hour, the dithiopropionic acid was separated from unreacted carbon disulfide and ethyl magnesium bromide. 10.6 g. of the dithiopropionic acid was placed in a condensation flask and 14.6 g. of benzalacetone was dissolved therein. The flask was warmed on a steam bath to a temperature of approximately 75° C. The flask was then cooled to room temperature and the side of the vessel was scratched to induce crystallization. The liquid was decanted therefrom and the crystals again dissolved in dilute methyl alcohol. The reaction product comprising α-phenyl-γ-ketobutyldithiopropionate was recrystallized from this methyl alcohol solution, the product having a melting point of 34.5–36.5° C. The α-phenyl-γ-ketobutyldithiopropionate had a sulfur content of 24.7. This sulfur analysis corresponds closely to the 25.4% by weight calculated for α-phenyl-γ-ketobutyldithiopropionate.

*Example II*

Dithiopropionic acid is prepared according to the method set forth in Example I above. Methyl vinyl ketone is reacted with the dithiopropionic acid in a condensation flask equipped with heating and stirring means at a temperature of approximately 50° C. At the end of approximately 4 hours, the reaction mixture is cooled to room temperature and the γ-ketobutyldithiopropionate is separated from the unreacted starting materials.

*Example III*

This example illustrates the use of an additive of a compound of the present invention in the stabilization of lubricating oil. 0.1% by weight of α-phenyl-γ-ketobutyldithiopropionate is commingled with the lubricating oil. This will serve to stabilize the lubricating oil and retard oxidative deterioration thereof.

We claim as our invention:
1. A γ-ketoalkyl ester of a dithiocarboxylic acid.
2. γ-ketobutyldithiopropionate.
3. α-phenyl-γ-ketobutyldithiopropionate.

References Cited in the file of this patent

UNITED STATES PATENTS

| | | |
|---|---|---|
| 2,427,582 | Vinton | Sept. 16, 1947 |
| 2,438,599 | Blake | Mar. 30, 1948 |
| 2,535,877 | Stewart | Dec. 26, 1950 |
| 2,710,872 | Thompson | June 14, 1955 |